(12) United States Patent
Klausnitzer

(10) Patent No.: US 7,536,310 B2
(45) Date of Patent: May 19, 2009

(54) METHOD FOR MANAGING AND PROVIDING AN IDEA MANAGEMENT SYSTEM

(75) Inventor: Norbert Klausnitzer, Uttenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 1203 days.

(21) Appl. No.: 10/633,852

(22) Filed: Jul. 31, 2003

(65) Prior Publication Data

US 2005/0044135 A1 Feb. 24, 2005

(51) Int. Cl.
*G06F 17/50* (2006.01)
(52) U.S. Cl. .......................................................... 705/7
(58) Field of Classification Search ........................ 705/7
See application file for complete search history.

(56) References Cited

U.S. PATENT DOCUMENTS

| 2002/0095305 A1* | 7/2002 | Gakidis et al. ................. 705/1 |
| 2002/0107722 A1* | 8/2002 | Laurin et al. ................. 705/10 |
| 2003/0036947 A1 | 2/2003 | Smith, III et al. |

FOREIGN PATENT DOCUMENTS

WO     WO 0217108 A   *   2/2002

OTHER PUBLICATIONS

Yva et al "Proceedings of the second conference on European Conference on Computer-Supported Cooperative Work), discloses the concept of accepting design ideas", Dec. 1991, Kluwer Academic Publishers Norwell, MA, USA , pp. 97-112.*
Evaristo (Creativity in idea management: An Application to GDSS), Dec. 1993, IEEE, pp. 1-2.*
Evaristo et al "Creativity in idea generation; an application to GDSS" Dec. 1993, IEEE. pp. 1-9.*

* cited by examiner

*Primary Examiner*—Romain Jeanty

(57) ABSTRACT

The present invention provides a method of managing an idea management system and providing the system as a service to a third party (e.g. a customer). By this configuration, ideas originated by employees of the customer can flow into the products or services of the provider of the idea management system. The invention can increase the relationship between the service provider and the customer, therefore the invention is regarded to be an aspect of CRM (Customer Relationship Management). If the customer and the service provider will use a common software platform, a common middleware platform or a common information system (e.g. ERP-system; Enterprise Resource Planning) the CRM aspect of the invention will be additionally strengthened. Furthermore the incoming ideas are not only of interest for the service provider to get into its own products and services, but also could be retailed to third parties.

17 Claims, 3 Drawing Sheets

METHOD FOR MANAGING AND PROVIDING AN IDEA MANAGEMENT SYSTEM

FIELD OF THE INVENTION

The present invention relates in general to a method of managing and providing an idea management system, and in particular to a method of managing and providing an idea management system as a service to customers whereby arising ideas by the customers are also usable by the service provider.

BACKGROUND OF THE INVENTION

It is well known that companies regard the ideas of their employees as excellent sources for improvements of the companies' products, services and processes. Companies increasingly call upon their employees to consider, develop and implement suggestions for company improvement. The improvements can be internal (e.g. work safety or in-house processes) or external (e.g. improvement of products or public image). In order that ideas of the employees will not be lost within the company, it is common for companies to implement idea management systems, also called employee suggestion systems. These systems typically include encouraging employees to create ideas, providing an idea submission process to submit these ideas to proper decision-makers, providing a defined and transparent evaluation procedure, and providing a rewards or remuneration process.

The implementation and managing of a successful idea management system is appreciably complex, requiring experience and expertise in management and human relations.

US PAP 2002/0107722 discloses a typical system, method and computer program product for idea management, whereby information is entered into a series of templates to develop a structured idea. Once the structured idea is developed, a server determines one or more members of the business management to whom the idea is routed based upon the information entered by the employee in the templates. US PAP 2003/0036947 discloses another conventional system and technique for managing the submission of ideas in an organization.

SUMMARY OF THE INVENTION

The present invention provides a method of managing an idea management system and providing the system as a service to a customer, whereby arising ideas by the customers are also usable by the service provider. In the context of the invention, the term "idea" comprises new inventive ideas, as well as suggestions to improve the status quo. With this configuration, the ideas originated by employees of the customer can improve not only customer's products and services, but also the products and services of the provider of the idea management system. The invention can also be used to improve the relationship between the service provider and the customer, therefore the invention is regarded to be an aspect of CRM (Customer Relationship Management). If the customer and the service provider use a common software platform, a middleware platform or a information system (e.g. ERP—system; Enterprise Resource Planning) to implement the idea management system of the present invention, the CRM aspect of the invention will be additionally strengthened. Furthermore, the incoming ideas could be retailed to third parties under appropriate circumstances.

One aspect of the present invention thus involves a method of managing an idea management system and providing the idea management system to a customer, whereby a service provider implements the idea management system for the customer and whereby the service provider uses ideas generated from the idea management system to improve a product or service for the service provider.

Another aspect of the present invention thus involves a computer system for remote supporting and operating an idea management system, comprising: at least one computer; mechanism for entering ideas into the idea management system; mechanism for evaluating the ideas; mechanism for dispatching the ideas to relevant persons or locations; mechanism for exchanging data around the sites and mechanisms for storing the data.

Further aspects, features and advantages of the present invention will become apparent from the drawings and detailed description of the following preferred embodiments.

BRIEF DESCRIPTION OF THE DRAWINGS

The above-mentioned and other concepts of the present invention will now be addressed with reference to the drawings of the preferred embodiments of the present invention. The shown embodiments are intended to illustrate, but not to limit the invention. The drawings contain the following figures, in which like numbers refer to like parts throughout the description and drawings and wherein.

DETAILED DESCRIPTION OF THE PREFERRED EMBODIMENT

Overview

A concept of the invention involves an idea management system that will not be managed by the affected company itself, but by an external service provider. Prior art approaches conduct the idea management system within a proprietary environment (e.g. an independent business), since they regard the creativity and the ideas of employees as an asset of only the company for which the employees work. An advantage of the invention is that from the affected company (customer) perspective, it doesn't have to learn the advanced management and human relations aspects necessary to successfully implement an idea management system and can quickly and effectively implement the ideas generated from the idea management system by leveraging the skills and expertise of the service provider. From the service provider perspective, the ideas generated by the customer can be used to help the service provider under certain circumstances (e.g. confidentiality). Thus a competitive advantage can be gained by both the customer and the service provider.

Figure 1:
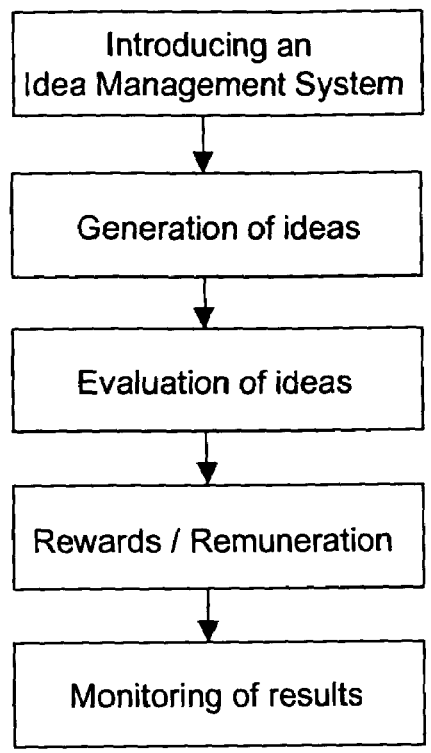
FIG. 1 is a flowchart, showing steps which will be typically performed implementing an idea management system.

FIG. 1 depicts a flowchart showing an exemplary typical idea management system. Those skilled in the art will readily understand other steps that could be used managing an idea management system, and not all these illustrated steps must be used. Introduction of an idea management system comprises generation of employee attention and providing a framework of how the idea management system will operate, such as FIG. 1 flowchart. Attention can be reached through promotion the benefits of an idea management system (via flyers, posters, websites, information and discussion sessions) for the company overall and for the employees individually, trainings etc.). Benefits for the company include better products, better services, better processes. Benefits for the employees include rewards and remuneration. Care should also be taken not to disregard staff and management concerns since idea management systems often require a culture change in a company and could be misinterpreted as means for usurping control and supervision authority.

Generation of ideas can be stimulated in a variety of ways. For example by meetings with employees that present special knowledge, experience or responsibilities (e.g. product managers, development managers, sales people). The results could be amplified by special creativity workshops (e.g. focus groups, workshops using the deBono™ "lateral thinking" method), or through fostering a creative environment (e.g. mind-opening outdoor sites and events) or undisturbed office areas to allow mental concentration, among others.

Evaluation of the incoming ideas preferably comprises analyzing of the ideas to determine their merits (e.g. improving products, services, processes or saving costs) and preference for implementing them. Evaluation can be accomplished by special committees, special decision makers using templates and/or checklists. IT support (e.g. showing animated scenarios of the improvements triggered by the ideas or computing possible savings caused by an idea) can assist performing an evaluation. The evaluation committees can be mixed (consisting of members from the customer and the service provider) or a company dedicated committee. It is also conceivable that a first evaluation of an idea can be evaluated by a second evaluator such as a supervisor of the affected area.

Rewards and remuneration advantageously provide economic or non-economic motivation for employees to suggest ideas, who delivered the ideas. There are many ways to provide rewards and remuneration: For example, the customer will be responsible for awarding and remuneration of its employees or the service provider will be responsible for awarding and remuneration of customer's employees. This approach could be useful especially for such suggestions which flow directly in improvements of products, services and processes of the service provider. For another example, awarding and remuneration of customer's employees will be proportioned between the customer and the service provider according the respective benefits of the suggestions. Beside monetary incentives also other kinds of rewards could be possible. For example an additional day off or assignment of a preferred parking lot.

Monitoring may involve reviewing of the results of an implemented idea and tracking of the pending status of a suggested idea (e.g. reported, evaluated, remuneration paid, implemented etc.). The status of a delivered idea, its implementation in a product or service and the compensation is advantageously transparent to the employees.

An additional advantageous aspect of a good idea management system is the establishment of an efficient back office and its integration into the internal processes of the company. The back office supports the idea management system staff, which collects the ideas and monitors the ideas. The back office may also take care of any legal requirements, keeping the process ongoing and also continuously improve the idea management system. An efficient back office reduces the likelihood that no idea will be lost, and ensures that each idea will be evaluated with feedback provided to the suggesting employee. Furthermore the back office ensures a defined continuous maintenance of the idea management system (e.g. obtaining feedback from the staff and senior management).

Another advantageous aspect of a good idea management system is an efficient software support with an proper HMI (Human Machine Interface) regarding the invention. A common platform (e.g. a software framework or information system) with defined interfaces for all involved parties supports an idea management system.

Figure 2:
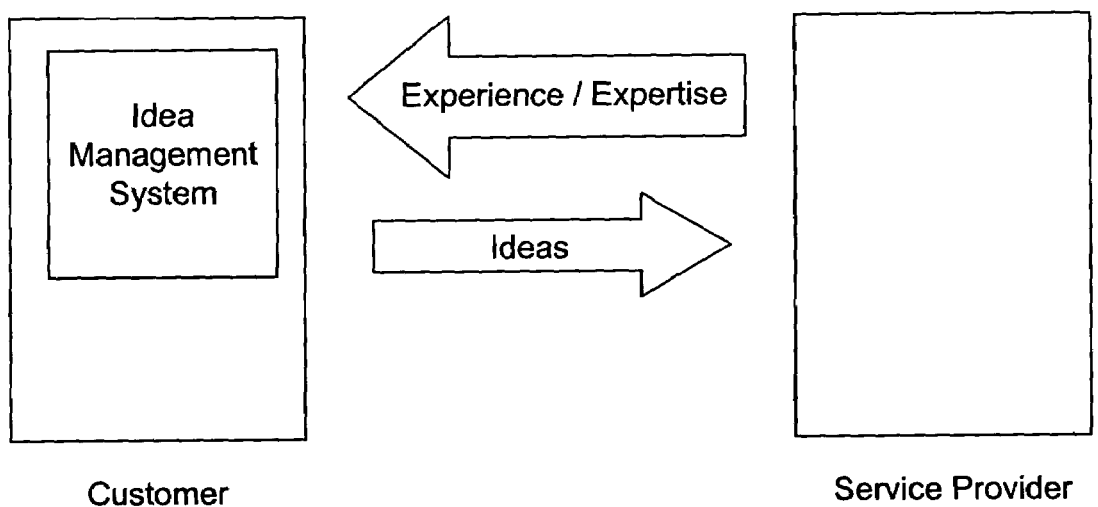
FIG. 2 is a schematic diagram showing the relationship between a service provider of an idea management system and a customer on which site the idea management system is implemented.

FIG. 2 is a schematic diagram showing the relationship between a service provider of an idea management system and a customer on which site the idea management system was implemented. The service provider (subcontractor of service provider) offers its knowledge, experience and expertise regarding introducing and operating an idea management system as a service to a customer and the customer receives a sound idea management system and the generated ideas. In return, the service provider receives compensation in form of having access to the generated ideas, money and/or preferred or exclusive conditions as a service provider or supplier for matters to the customer other than idea management. For example, the customer pays money for the service of introducing and/or the service of operating an introduced idea management system to the service provider. It is also conceivable that the service provider will offer its service for free, if the service provider participates on the incoming ideas or has exclusive rights on the incoming ideas, for example. Furthermore the service provider could pay for the right to implement and operate an idea management system at the customer, especially if the service provider has exclusive rights to exploit the ideas. This makes sense since the customer offers employees, the knowledge of its employees, office space etc. The amount of compensation may depend on the value for the service provider. FIG. 2 depicts an external party that offers its experience and expertise in introducing and operating an idea management system to a customer not only as a consultant would do, but also introduces and operates the idea management system at the customer site, its own site or a combination thereof. Another embodiment of the invention is that awarding and remuneration of the employees of a company (customer) can be accomplished by an external company (service provider).

Figure 3:
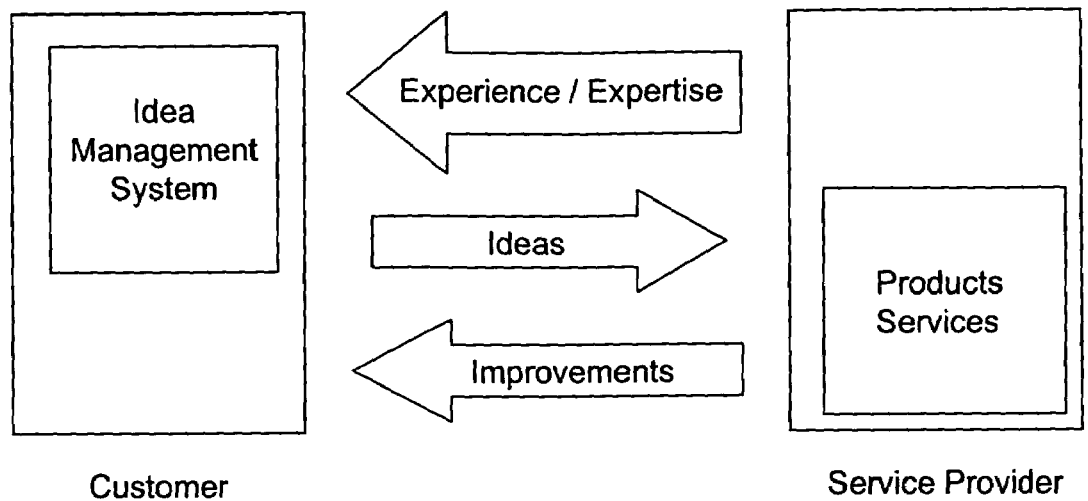
FIG. 3 is a schematic diagram showing an advanced relationship between a service provider of an idea management system and a customer on which site the idea management system is implemented.

FIG. 3 shows another embodiment of the invention, when the service provider is also an existing supplier to the customer, such as supplying medical devices to a hospital. If the service provider has an additional relationship with the customer (e.g. selling products and/or services to the customer) the service provider may be able to quickly and efficiently use the incoming ideas in improvements of these products and services. Therefore this embodiment of the invention provides a circuit loop: occurring ideas at the customer's site can be used by an external company (service provider), who will with this ideas achieve improvements in its products and services. The improved products and services may be sold by the service provider to the customer. Thus the ideas will "flow back" to the customer via incorporated improvements in products and services. This embodiment of the invention can be integrated in the service provider's complaint management system.

Figure 4:
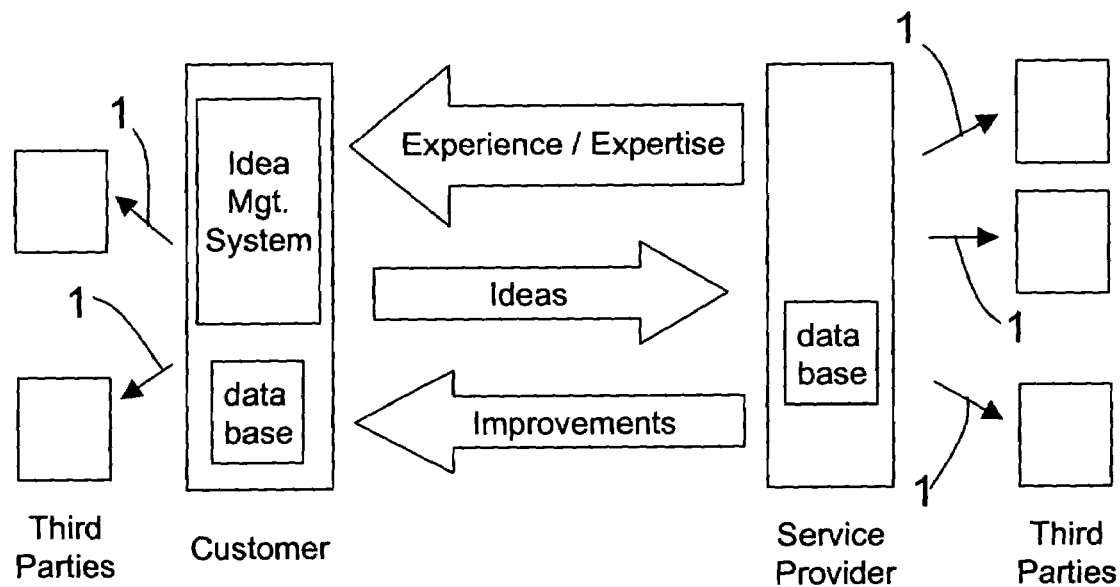
FIG. 4 is a schematic diagram showing the relationship between a service provider of an idea management system, a customer on which site the idea management system is implemented, and third parties interested in the generated ideas.

FIG. 4 shows an alternative embodiment of the invention. The invention is not limited in improvements of products and services which will be delivered to the customer, whose employees conceived the ideas. The improvements based on the ideas can also be incorporated in products and services, which will be offered for sale or license by the service provider to third parties. Afterward the incoming ideas have been evaluated they could be stored and classified in one or more databases, for example. The databases can be operated by the customer, service provider or both. These databases and or individual ideas can be offered and retailed to other interested third parties (on behalf of the customer or service provider). Depending on the value of the ideas the customer, service provider or both can be compensated for the ideas or implementation thereof. This aspect of the invention expands and strengthens the CRM activities also to the third parties. The promotion, distribution and sales channels 1 between the service provider and the third parties or between the customer and third parties can be various. For example a third party can also be service provider for the customer, so the distribution channel can be customer driven and is conceivable that the third party could have access to the information system of the customer. A third party can also be a supplier of the service provider and could have access to the information system of the service provider. So the channels 1 can be electronically (e.g. via Internet, via email or via software interfaces to information systems) or conventionally (e.g. via phone calls, call center, visits of sales men).

Figure 5:
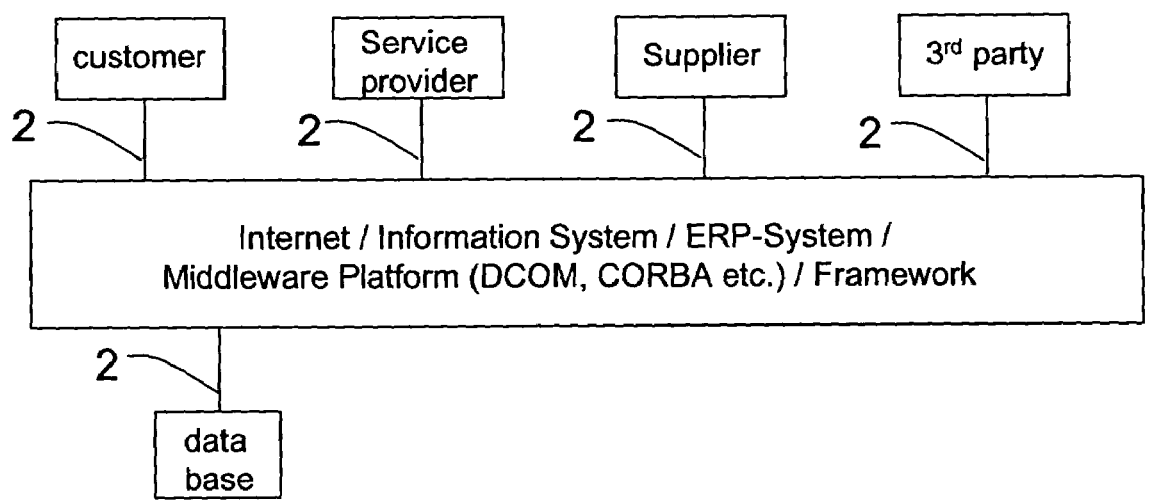
FIG. 5 is a schematic diagram showing a typical electronic interface between involved parties.

FIG. 5 shows in a schematic diagram an exemplary electronic connection between the involved players. The invention allows integration of the customer and the service provider in a common platform. By using a common platform the incoming ideas can be fast forwarded to the service provider, can be easily supplemented by the service provider among other advantages. Furthermore it is conceivable that suppliers (of customer and/or service provider) and third parties could be also integrated or connected to the common platform. Also data bases or repositories can be integrated or connected to the common platform. For example the platform can be the Intranet (Intranet), an Information System (e.g. an Hospital Information System), a process control system, an ERP-System, a middleware platform (e.g. DCOM, CORBA) or a software framework. Using a common platform the incoming ideas can easily reach the interested players and the access to necessary data (e.g. personal) is very easy. To realize a common platform a client server architecture is conceivable whereby the applications or modules of the involved players (e.g. collecting the ideas, analyzing the ideas, evaluation of the ideas, remuneration, retailing of the ideas) can be integrated as clients. The functions of the idea management system can be implemented on a server. The integration 2 of the applications of the customer, service provider, supplier, third parties and data bases can be achieved e.g. by adapter or wrapper, using appropriate data formats (e.g. XML, HTML) or protocols (e.g. XOP, HTTP). As transport mechanism in a software framework can e.g. DCOM or MSMQ be used. If the clients or the applications support ActiveX documents the integration and connection can accomplished neatly. If the Internet/Intranet is used as common platform Java applets can easily be used to operate the idea management system electronically, for example. The invention and especially the integration of the players to a common platform allow a fast transfer of know how, a fast and focused optimization of products and services. Furthermore the invention strengthens the business relationships between the players (CRM aspect) since the invention enables a fast and goal oriented satisfaction of customer requests. Furthermore ideas and proposals can easily organized, stored and classified in one or more data bases. The computer system used for operating and supporting the idea management system can comprise a workstation, a PC or a distributed and connected computer system. For example, keyboards or touch screens can be used for entering data and ideas. Templates and spreadsheets among others can be used as tools to analyze and evaluate the ideas (even online in the committees). Emails or common office programs like Microsoft's Outlook can be used to dispatch (forward to relevant persons or locations) and trace the ideas. Also configuration and change management tools can be used for dispatching and tracing the ideas. Data bases on data servers can be used as storage media among others. Tracing the ideas can be optional.

In addition to the embodiments of the aspects of the present invention described above, those of skill in the art will be able to arrive at a variety of other arrangements and steps which, if not explicitly described in this document, nevertheless embody the principles of the invention and fall within the scope of the appended claims. For example, the ordering of method steps is not necessarily fixed, but may be capable of being modified without of departing from the scope and spirit of the present invention.

What is claimed is:

1. A method of managing an idea management system comprising:
 relating a first business organization as a customer of a second business organization independent from the first business organization, said second organization being a service provider of at least the customer;
 developing computer-readable code by the service provider, the code when executed by a computer allowing the customer to manage the idea management system;
 providing the code for managing the idea management system to the customer, wherein the service provider is a recipient of ideas submitted by employees of the customer into the idea management system to improve a product or service purveyed by the service provider to at least the customer; stimulating a flow of ideas from the customer through a remuneration or a reward provided by the service provider to employees of the customer for ideas submitted into the idea management; compensating by the service provider the customer for commercializing ideas submitted into the idea management system by the employees of the customer, wherein the method includes generating by the idea management system a multimedia presentation that conveys an animated graphical presentation of one or more scenarios resulting from ideas submitted by the customer to improve the product or service purveyed by the service provider, said multimedia presentation used for evaluating the submitted ideas.

2. The method according to claim 1, wherein the improved products and services are sold to the customer.

3. The method according to claim 1, wherein the compensation depends on the amount of benefit that the idea provides.

4. The method according to claim 1, wherein the idea management system is integrated to an Enterprise Resource Planning (ERP) System.

5. The method according to claim 4, wherein the idea management system is integrated to a common ERP System of the service provider and the customer.

6. The method according to claim 1, wherein the ideas are offered for sale or lease to third parties.

7. The method according to claim 1, wherein the service provider uses a contractor to implement the idea management system for the customer.

8. The method according to claim 1, wherein the idea management system is connected to an information system.

9. The method according to claim 8, wherein the infonnation system is a hospital information system.

10. The method according to claim 1, wherein the service provider is connected via a computer network with the customer.

11. The method according to claim 10, wherein third parties are connected with the service provider or the customer via a computer network.

12. The method according to claim 1, wherein the service provider is connected via a software framework with the customer.

13. The method according to claim 12, wherein third parties are connected with the service provider or the customer via a software framework.

14. A computer system for remote supporting and operating an idea management system, the computer system comprising:
- at least one computer loaded with computer readable code developed by a service provider, wherein the idea management system is managed by a first business organization comprising a customer with respect to a second business organization independent from the first business organization, said second organization being the service provider of at least the customer, the computer readable code configured to implement the following mechanisms in the idea management system:
- mechanism for entering ideas into the idea management system, the ideas being submitted by employees of the customer into the idea management system to improve a product or service purveyed by the service provider to at least the customer;
- mechanism for evaluating the ideas and including a mechanism for generating a multimedia presentation that conveys an animated graphical presentation of one or more scenarios resulting from the ideas submitted by the customer to improve the product or service purveyed by the service provider;
- mechanism for stimulating a flow of ideas from the customer through remuneration or a reward provided by the service provider to employees of the customer for ideas submitted into the idea management system;
- mechanism for the service provider to compensate the customer for commercializing ideas submitted into the idea management system by the employees of the customer;
- mechanism for dispatching the ideas submitted by employees of the customer to relevant persons or locations;
- mechanism for exchanging data about the ideas submitted by employees of the customer to improve the product or service purveyed by the service provider; and
- mechanism for storing the data.

15. A computer system according claim 14, whereby the system is a client server system.

16. A computer system according claim 14, whereby the system offers interfaces to third parties.

17. A computer system according claim 14, whereby the system is integrated in a ERP system.

* * * * *